April 22, 1930. R. A. HILL 1,755,543
DETACHABLE COMMERCIAL BODY FOR AUTOMOBILE TONNEAUX
Filed June 29, 1928
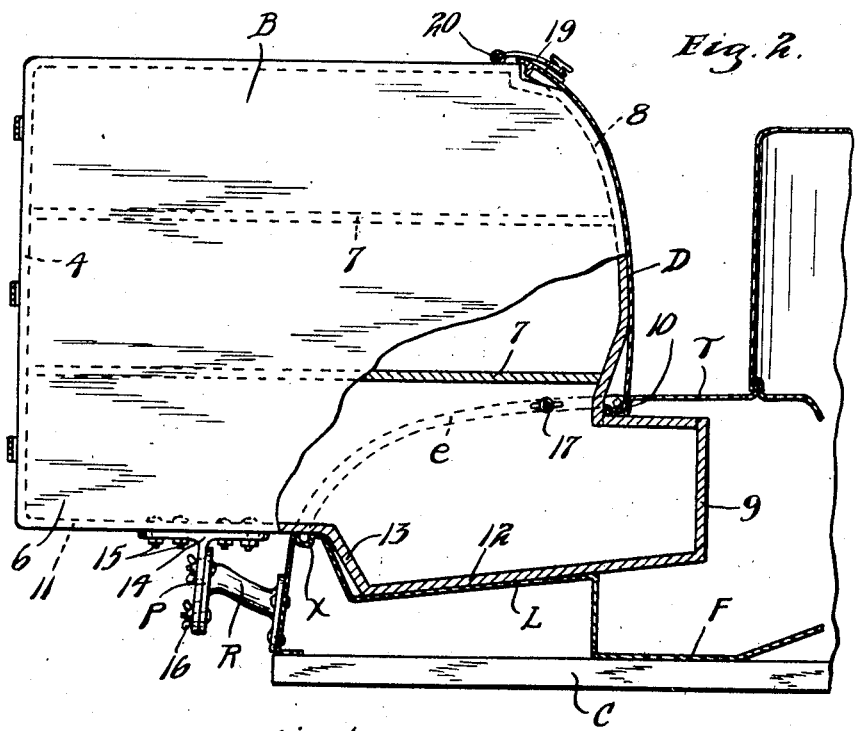
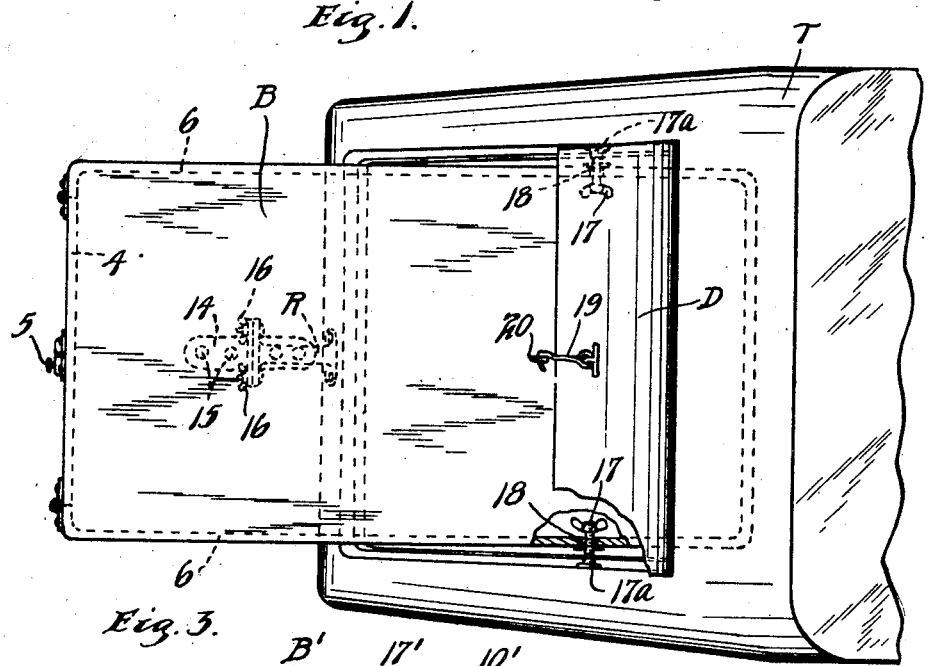
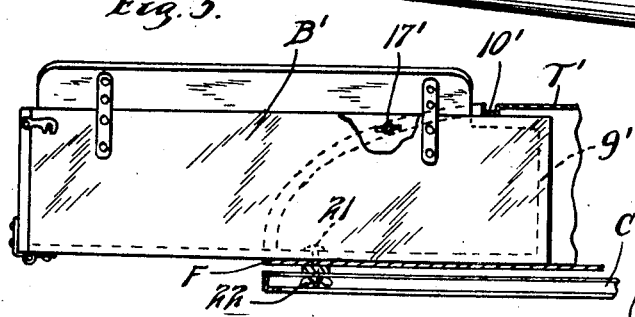
INVENTOR.
ROSCOE A HILL.
BY HIS ATTORNEYS.

Patented Apr. 22, 1930

1,755,543

UNITED STATES PATENT OFFICE

ROSCOE A. HILL, OF ST. PAUL, MINNESOTA

DETACHABLE COMMERCIAL BODY FOR AUTOMOBILE TONNEAUX

Application filed June 29, 1928. Serial No. 289,270.

This invention relates to delivery or truck body attachments for automobiles and especially to such attachments for the tonneau of a pleasure car.

It is an object of my invention to provide an auxiliary body for converting pleasure automobiles into delivery vehicles which may be simply and easily attached to the tonneaux of roadsters and coupés.

It is another object of my invention to provide a simple but highly efficient delivery or truck body for pleasure vehicles, which may be quickly and easily attached to the tonneau of pleasure automobiles without changing the structure of the automobile body and which may be as easily and quickly removed to permit the vehicle to be used for pleasure purposes.

A further object of my invention is to provide a quickly detachable auxiliary body for the tonneaux of coupés and roadsters which when attached will convert the vehicle into a truck or delivery vehicle of neat attractive appearance without requiring the alteration or removal of parts from the tonneau, special provision being made in the auxiliary body for rigid attachment with coupés and roadsters of standard type.

Another object is to provide an auxiliary body of the class above described, of such shape and structure as to co-operate with the construction of the tonneaux of standard motor vehicles to permit the detachable body to be quickly secured to the tonneau of a coupé or roadster against lateral, longitudinal and upward displacement.

These and other objects and advantages of the invention will be apparent from the following description made in connection with the accompanying drawings in which like reference characters refer to similar parts throughout the several views, and in which.

Fig. 1 is a plan view of an embodiment of my invention attached to a Ford type of coupé or roadster, some parts of my auxiliary body and a portion of the tonneau door being broken away;

Fig. 2 is a side view of the same showing the tonneau and rear portion of the Ford body in cross section and most of my auxiliary body in side elevation, some portions of said body being broken away and others shown in section; and Fig. 3 is a side elevation showing a modification of my invention in the form of an auxiliary truck body attached to the tonneau of a standard type of motor vehicle, wherein the door for the tonneau extends to the floor or bottom and is removed from the automobile body.

In the drawings (Figs. 1 and 2), the rear portion of a Ford type of roadster or coupé is illustrated supported on the usual channel members C of the chassis and including the tonneau enclosure T, which is provided with the usual curved door D hinged at its upper edge to the tonneau, the doorway having the curved inner edges e and the lower edge or flange X, which is disposed some distance above the channel members C and slightly above the tire rack bracket R, which is provided in the usual manner with the attachment plate P of triangular shape, said plate having a plurality of apertures therethrough to permit attachment of the tire rack. The tonneau is shown as having a sheet metal floor F having an upwardly inclined forward portion and formed integral with a forwardly inclined ledge L which is adapted to receive a seat if it is desired to provide the tonneau with a rumble seat.

As shown in Figs. 1 and 2 my detachable auxiliary body is in the form of a delivery box B having the oppositely hinged rear doors 4, which may be retained in closed position by any suitable means, such as the latch 5. Box B, as shown, is provided with parallel vertical sides 6 across which a plurality of supporting shelves 7 may be secured, said shelves extending from the rear to the front wall 8 of said box.

The upper and greater portion of the front wall 8 is curved to conform in shape to the under surface of the tonneau door D and when box B is applied, said tonneau door is raised to substantially erect position, the side flanges thereof overlapping the forward edges of the box. The lower forward portion 9 of box B is offset from the main or upper portion and forms an anchoring member, the top surface of which is adapted to snugly fit below the forward ledge 10 of the doorway for the tonneau door. The bottom of my box B has a horizontal rear portion 11 and an offset forward portion 12 adapted to be supported on the seat ledge L. The joint between said forward and rearward portions of the bottom form a shoulder 13 adapted to abut the lower edge of the tonneau doorway and to assist in preventing rearward displacement of the box from the tonneau.

The tire rack bracket R illustrated in the drawings is that of the Ford type car and is mounted on the car for the purpose of supporting a tire or wheel. With my invention the tire or wheel is removed and a depending plate 14 rigidly secured by any suitable means, such as the bolts 15 to the rear horizontal portion 11 of the box bottom is secured to plate P of the tire bracket, by quickly detachable means, such as the thumb screws 16. The connection between the rear end of the box and the tire bracket R is preferably an adjustable one in order that the lower edge X of the door casing may be relieved of the weight of the box. To this end, any suitable means may be supplied such as for example, the plate 14 may be provided with vertical slotted apertures through which the bolts of wing nut 16 may extend. In this way, the vertical position of plate 14 may be secured with reference to the tire bracket.

In most commercially built roadsters and coupés the doorway and door of the tonneau is slightly wider at the top edge than at the lower edge, which assuming my box B to be of substantially rectangular shape and to snugly fit the lower edge of the doorway would leave some space between the vertical side walls of the box and the upper edges of the doorway. I provide clamping members which may be manipulated from the inside of the box, such as the laterally and horizontally extending clamping bolts 17 having threaded engagement with suitable sleeves or threaded bushings 18 mounted in the side walls of the box, which clamping bolts swivelly carry at their outer ends jamb elements 17a preferably of some material, such as rubber, which has a degree of compressibility. The jamb elements 17a are adapted to engage the side edges e of the tonneau doorway. The tonneau doors of most automobiles are usually provided with suitable stop means, such as toggle links to limit the upward swinging movement and hold the door in open position. In attaching my box it is necessary to release one connection of the toggle link or other stop means in order that the door D may be swung to erect position, as illustrated in Fig. 2. The door then completely covers the forward end of box B giving the same a neat finished appearance. The handle of the door may be releasably secured to the top of box B by any suitable means, such as a hook 19, one end of which surrounds the door handle and the hooked end of which may engage a suitable eye 20 fixed to the top of the box adjacent the forward edge thereof.

To attach my delivery box B to a roadster or coupé of standard construction, such as the Ford type of car, illustrated it is only necessary to swing the tonneau door to erect position, as shown in Fig. 2, slip the offset forward portion 9 of the box beneath the forward ledge 10 of the doorway and lower the box slightly until the forward portion 12 of the bottom is supported upon ledge L and the shoulder 13 engages the lower edge or flange X of the doorway. The depending plate 14 secured to the bottom of the box may then be quickly secured to the plate P of the tire bracket R by affixing one or more bolts and the clamping members 17 may be screwed outwardly to tightly engage the side edges of the doorway, thereby additionally securing the box against lateral displacement. The free edge of the tonneau door is then securely fixed to the top of the box by hook 20.

It will be seen that when applied, my attachment presents a neat, ornate appearance, projecting slightly beyond the rear of the automobile and affording vertical surfaces upon which advertising or company identification may be carried. It will, of course, be obvious that boxes of different shape, such as the truck box shown in Fig. 3, may be substituted for the particular form of delivery box shown in Figs. 1 and 2, all within the scope of the invention, the attachment including the offset anchoring portion 9, the supporting forward portion 12 of the bottom, the shoulder 13, the depending plate 14 and the clamping members 17 being employed to rigidly secure the attachment to the tonneau of the automobile.

In Fig. 3 only the rear portion of the tonneau T' of a different type of automobile than that illustrated in Figs. 1 and 2 is shown, the doorway in said tonneau extending to the floor F. Floor F. as shown in Fig. 3, is horizontal, no provision being made for a rumble seat. Here the truck box B' has a flat bottom and a forward end 9' is projected beneath the upper ledge 10' of the tonneau doorway in the same manner as the offset portion 9 of box B. The truck box B' rests upon the floor F of the tonneau and a depending bolt 21 carried by a suitable portion of the bottom of the truck box B' is adapted to extend through floor F or the tonneau bottom and be rigidly secured thereby by means of a suitable clamping member, such as the wing nut 22. Clamping bolts 17' similar to the clamping members 17 shown in the preferred form are provided in truck box B' and are adapted to engage the side edges of the tonneau doorway to assist in preventing lateral displacement of the box during travel.

It will be seen that either form of my invention may be as quickly detached from the automobile body as it is applied thereon, it being only necessary to loosen the clamping bolts 17 on 17', release the engagement of plate 14 with the tire bracket R or loosen the wing nut 22 as the case may be and lift the attachment slightly, while sliding the same rearwardly from the tonneau. The door of the tonneau may then be closed and the car is ready for pleasure use.

From the foregoing description it will be seen that I have invented an extremely simple but highly efficient delivery or truck body attachment for pleasure vehicles adapted to be attached or removed at a minute's notice and adapted to co-operate with the standard elements of tonneau construction to convert a pleasure car into a truck or delivery vehicle of ornate and neat appearance.

It will, of course, be understood that various changes may be made in the form, details, arrangement and proportions of the parts without departing from the scope of applicant's invention.

It will also be understood that while the clamping bolts 17 are illustrated in the drawings to prevent lateral displacement of the forward portion of the box body, that any suitable retaining means which will anchor the vertical sides of the body to the longitudinal edges of the doorway may be substituted and that while Figs. 1 and 2 show the tonneau door covering the forward end of the box, that if desired, this door may be easily removed when it is desired to convert the car into a delivery vehicle and the forward end of the box may be built vertical.

What is claimed is:

1. A detachable body for automobile tonneaux comprising a box structure having a front portion adapted to underlie the ledge at the front of the tonneau doorway and having a bottom provided with an offset forward portion adapted to be supported from the bottom portion of the tonneau structure, said offset portion providing an abutment shoulder to prevent rearward longitudinal displacement of said box structure.

2. A detachable body for automobile tonneaux comprising a box structure having a bottom provided with an offset forward portion adapted to fit within a tonneau and be supported from the bottom portion of said tonneau, said offset portion affording an abutment shoulder adapted to prevent rearward longitudinal displacement of said box structure, and means for rigidly securing the bottom of said box structure to the tire carrier bracket at the rear of said tonneau.

3. In combination with an automobile tonneau having a doorway and a seat supporting ledge disposed therein and positioned above the floor of the tonneau and below the rear edge of the doorway, a box structure having a bottom provided with an offset forward portion adapted to be disposed within said tonneau and to be supported from said seat supporting ledge, the rear portion of said bottom overlying the rearward edge of the doorway and projecting beyond the rear of said tonneau, and means for securing said box structure to said tonneau.

4. In combination with an automobile tonneau having the usual curved door hinged at its upper edge, a detachable box structure having a lower forward portion adapted to fit within the doorway of said tonneau and having a curved upper forward end conforming in shape to said door, whereby when said box structure is applied to said tonneau with said door disposed in open position, said door will cover and finish off the forward end of said box structure, and means for securing said box structure to said tonneau.

5. In combination with an automobile tonneau having the usual doorway through the upper portion thereof, provided with a tire carrying bracket at the rear thereof, a detachable box structure having a lower forward portion adapted to fit within said doorway, a depending member secured to the rear portion of the bottom of said box structure, and means for securing said member to said tire carrying bracket with provision for vertical adjustment relatively thereto.

6. A detachable body for automobile tonneaux comprising a box structure having a bottom and substantially vertical spaced sides, the lower and forward portion of said box structure being adapted to fit within the doorway of said tonneau and supported from the lower portion of said tonneau, said bottom having depending means at its medial portion constituting an abutment shoulder adapted to engage the rear edge of the tonneau doorway to prevent longitudinal displacement of said box structure and means for securing said structure to said tonneau.

7. In combination with an automobile tonneau having the usual curved door hinged at its upper edge, a detachable box structure adapted to be mounted in the doorway of said tonneau and having a curved forward end conforming in shape to said door, whereby when said box structure is applied to said tonneau with said door disposed in open position said door will cover and finish off the forward end of said box structure, and means for detachably securing said box structure to said tonneau.

8. In combination with an automobile tonneau having the usual rectangular doorway through the upper portion thereof, a box structure having a bottom and substantially vertical side walls, the forward portion of said box structure being disposed within said tonneau through said doorway with said side walls opposed to the side edges of said doorway, outwardly projecting horizontal members on said side walls for engaging the side edges of said doorway, at least one of said members being projectable outwardly to clamp the forward portion of said box structure in said doorway, and means for securing the rear portion of said box structure to the rear portion of said tonneau.

9. In combination with an automobile tonneau having the usual rectangular doorway through the upper portion thereof, a box structure having a bottom, spaced vertical side walls and a forward end connecting said side walls, the forward and lower portion of said box structure being disposed within said tonneau through said doorway, forwardly projecting means carried by said forward end and underlying the front edge of said doorway, the rear portion of said bottom being supported upon the rear edge of said doorway and overhanging the rear of said tonneau, and means for detachably securing the overhanging portion of said box structure with the rear of said tonneau.

In testimony whereof I affix my signature.

ROSCOE A. HILL.